United States Patent
Mercer

(10) Patent No.: US 10,260,788 B2
(45) Date of Patent: Apr. 16, 2019

(54) SYSTEM AND METHOD FOR CONTROLLING AN ELECTRONIC EXPANSION VALVE

(71) Applicant: Carrier Corporation, Farmington, CT (US)

(72) Inventor: Kevin Mercer, Danville, IN (US)

(73) Assignee: CARRIER CORPORATION, Farmington, CT (US)

( * ) Notice: Subject to any disclaimer, the term of this patent is extended or adjusted under 35 U.S.C. 154(b) by 123 days.

(21) Appl. No.: 15/227,809

(22) Filed: Aug. 3, 2016

(65) Prior Publication Data
US 2017/0038108 A1 Feb. 9, 2017

Related U.S. Application Data

(60) Provisional application No. 62/202,519, filed on Aug. 7, 2015.

(51) Int. Cl.
*F25B 49/02* (2006.01)

(52) U.S. Cl.
CPC ........ *F25B 49/02* (2013.01); *F25B 2341/065* (2013.01); *F25B 2500/19* (2013.01); *F25B 2600/2513* (2013.01); *F25B 2700/1933* (2013.01); *F25B 2700/2117* (2013.01); *F25B 2700/21151* (2013.01); *Y02B 30/72* (2013.01)

(58) Field of Classification Search
CPC .................. F25B 49/02; F25B 2500/19; F25B 2700/21151; F25B 2700/1933; F25B 2700/2117
See application file for complete search history.

(56) References Cited

U.S. PATENT DOCUMENTS

| | | | |
|---|---|---|---|
| 4,404,811 A | 9/1983 | Mount et al. | |
| 4,845,956 A * | 7/1989 | Berntsen | F25B 41/062 62/212 |
| 5,187,944 A * | 2/1993 | Jarosch | B60H 1/321 62/212 |

(Continued)

FOREIGN PATENT DOCUMENTS

| CN | 102384618 A | 3/2012 |
|---|---|---|
| CN | 104457054 A | 3/2015 |

(Continued)

OTHER PUBLICATIONS

Jensen et al., A Method for Controlling a Vapour Compression System During Start-up, Feb. 27, 2014, W)2014029402A1, Whole Document.*

(Continued)

*Primary Examiner* — Larry L Furdge
(74) *Attorney, Agent, or Firm* — Cantor Colburn LLP

(57) ABSTRACT

A system and method of controlling an electronic expansion valve in a refrigeration system is provided. The system and method include providing an evaporator, a compressor, and an electronic expansion valve in a refrigeration circuit with a suction line between the evaporator and the compressor, determining a change rate at the suction line, determining a superheat value at the suction line if it is determined that the change rate is less than or equal to a change rate limit, and operating the electronic expansion valve based on the superheat value.

20 Claims, 3 Drawing Sheets

(56) References Cited

U.S. PATENT DOCUMENTS

| | | | |
|---|---|---|---|
| 5,222,371 A | | 6/1993 | Doyama et al. |
| 5,551,248 A | * | 9/1996 | Derosier .............. F24F 11/0009 |
| | | | 62/155 |
| 6,059,027 A | | 5/2000 | Lake et al. |
| 6,082,128 A | | 7/2000 | Lake et al. |
| 6,089,034 A | | 7/2000 | Lake et al. |
| 6,318,101 B1 | | 11/2001 | Pham et al. |
| 6,360,553 B1 | | 3/2002 | Singh et al. |
| 6,453,690 B1 | | 9/2002 | Kim |
| 7,861,546 B2 | | 1/2011 | Landers et al. |
| 8,191,377 B2 | | 6/2012 | Aiyama et al. |
| 2010/0204840 A1 | | 8/2010 | Sun et al. |
| 2013/0205815 A1 | * | 8/2013 | Izadi-Zamanabadi ...................... |
| | | | F25B 41/062 |
| | | | 62/115 |

FOREIGN PATENT DOCUMENTS

| | | | |
|---|---|---|---|
| KR | 20040089323 A | 10/2004 | |
| WO | WO 2014029402 A1 * | 2/2014 | .............. F25B 49/02 |

OTHER PUBLICATIONS

Dolin, Brian J., "Electric Expansion Valve Control", https://www.achrnews.com/articles/82356-electric-expansion-valve-control, Nov. 6, 2006; 229, 10.

\* cited by examiner

SYSTEM AND METHOD FOR CONTROLLING AN ELECTRONIC EXPANSION VALVE

CROSS-REFERENCE TO RELATED APPLICATIONS

The present application is a nonprovisional patent application, which claims priority to U.S. Provisional Patent Application Ser. No. 62/202,519, filed Aug. 7, 2015, and having the title "SYSTEM AND METHOD FOR CONTROLLING AN ELECTRONIC EXPANSION VALVE," which is herein incorporated in its entirety.

TECHNICAL FIELD OF THE DISCLOSED EMBODIMENTS

The presently disclosed embodiments generally relate to a heating, ventilation, and air conditioning (HVAC) system. More particularly, the embodiments relate to a system and method for controlling an electronic expansion valve in a refrigeration or HVAC system.

BACKGROUND OF THE DISCLOSED EMBODIMENTS

An expansion device, such as an expansion valve, is required in a refrigeration system or HVAC system to control refrigerant flow and maintain an optimum gas condition of the refrigerant entering the suction side of the compressor. Electronic expansion valves (EXVs) are typically used in refrigeration and HVAC systems. An EXV is an electronically driven valve that is typically adjusted based on control algorithms utilizing sensed temperature and pressure values in the refrigeration system. For example, typical control of EXVs involves a controller sending a signal to open or close the valve based on an evaluation of suction gas superheat. Superheat is the difference between an actual refrigerant temperature and a saturated refrigerant temperature. An accurately controlled EXV allows refrigerant entering the evaporator to fully evaporate in the evaporator. If the refrigerant does not fully evaporate in the evaporator, liquid refrigerant may enter the compressor and cause damage or failure. Therefore, the superheat threshold in the suction line of the compressor is maintained at an optimum value to prevent compressor damage while still operating at the most efficient point possible.

Typically, the EXV must be controlled across a wide range of HVAC operating conditions, including, but not limited to, temperature, humidity, and load. Under certain conditions, such as low ambient temperature start conditions (i.e., cold start or cold soak), long line set applications, or other transient operational conditions, suction pressure of the compressor may be especially low and cause low pressure trips to occur. These conditions often occur during system startup and prevent reliable operation of the HVAC system.

Therefore, there remains a need for a system and method of controlling an electronic expansion valve to provide reliable operation of an HVAC system across all operating conditions.

SUMMARY OF THE DISCLOSED EMBODIMENTS

In one aspect, a method of controlling an electronic expansion valve in a refrigeration system is provided. The method includes the steps of providing an evaporator, a compressor, and an electronic expansion valve in a refrigeration circuit with a suction line between the evaporator and the compressor, determining a change rate at the suction line, determining a superheat value at the suction line if it is determined that the change rate is less than or equal to a change rate limit, and operating the electronic expansion valve based on the superheat value.

In one embodiment, the method further includes operating the electronic expansion valve based on the change rate if it is determined that the change rate is greater than the change rate limit. In an embodiment, operating the electronic expansion valve based on the change rate includes advancing the electronic expansion valve position by a predetermined value of steps. In the embodiment, operating the electronic expansion valve based on the change rate further includes waiting a predetermined amount of time before repeating the step of determining the change rate.

In one embodiment, the method further includes determining whether the superheat value exceeds a threshold superheat value. In an embodiment, the method further includes operating the electronic expansion valve using a first set of control parameters if the superheat value exceeds a threshold superheat value. The method of an embodiment further includes operating the electronic expansion valve using a second set of control parameters if the change rate is less than or equal to the change rate limit, wherein the first set of control parameters corresponds to a faster control rate than the second set of control parameters.

In one embodiment, the change rate is a suction pressure change rate and the change rate limit is a pressure change rate limit. In one embodiment, the change rate is a temperature change rate and the change rate limit is a temperature change rate limit.

In one aspect, a refrigeration system is provided. The refrigeration system includes a compressor disposed in a refrigeration circuit, an evaporator disposed in the refrigeration circuit, a suction line disposed in the refrigeration circuit between the evaporator and the compressor, an electronic expansion valve disposed in the refrigeration circuit, and a controller in electrical communication with the electronic expansion valve. The controller is configured to determine a change rate at the suction line, determine a superheat value at the suction line, and operate the electronic expansion valve based on the superheat value if the change rate is less than or equal to a change rate limit.

In one embodiment, the controller is further configured to determine a superheat value at the suction line after determining that the change rate is less than or equal to a change rate limit. In one embodiment, the controller is further configured to operate the electronic expansion valve based on the change rate if it is determined that the change rate is greater than the change rate limit. In one embodiment, the controller is further configured to advance an electronic expansion valve position by a predetermined value based on the change rate. In one embodiment, the controller is further configured to again determine the change rate following the passage of a predetermined amount of time after advancing the electronic expansion valve position by the predetermined value. In one embodiment, the controller is further configured to determine whether the superheat value exceeds a threshold superheat value. In one embodiment, the controller is further configured to operate the electronic expansion valve using a first set of control parameters if the superheat value exceeds a threshold superheat value. In one embodiment, the controller is further configured to operate the electronic expansion valve using a second set of control parameters if the change rate is less than or equal to the change rate limit, wherein the first set of control parameters corresponds to a faster control rate than the second set of control parameters.

In another aspect, a controller for use with a refrigeration system is provided. The controller includes a processor, a memory, and executable software stored in the memory. The executable software determines a change rate at a suction line between a compressor and an evaporator of the refrigeration system, determines a superheat value at the suction line if it is determined that the change rate at the suction line is less than or equal to a change rate limit, and operates an electronic expansion valve based on the superheat value.

In one embodiment, the executable software transmits an electronic expansion valve advancing signal to the electronic expansion valve based on the change rate if it is determined that the change rate is greater than the change rate limit. In one embodiment, the executable software transmits a first control signal to the electronic expansion valve using a first set of control parameters if the superheat value exceeds a threshold superheat value and transmits a second control signal to the electronic expansion valve using a second set of control parameters if the change rate is less than or equal to the change rate limit, wherein the first set of control parameters corresponds to a faster control rate than the second set of control parameters.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE ENCLOSED EMBODIMENTS

Figure 1:
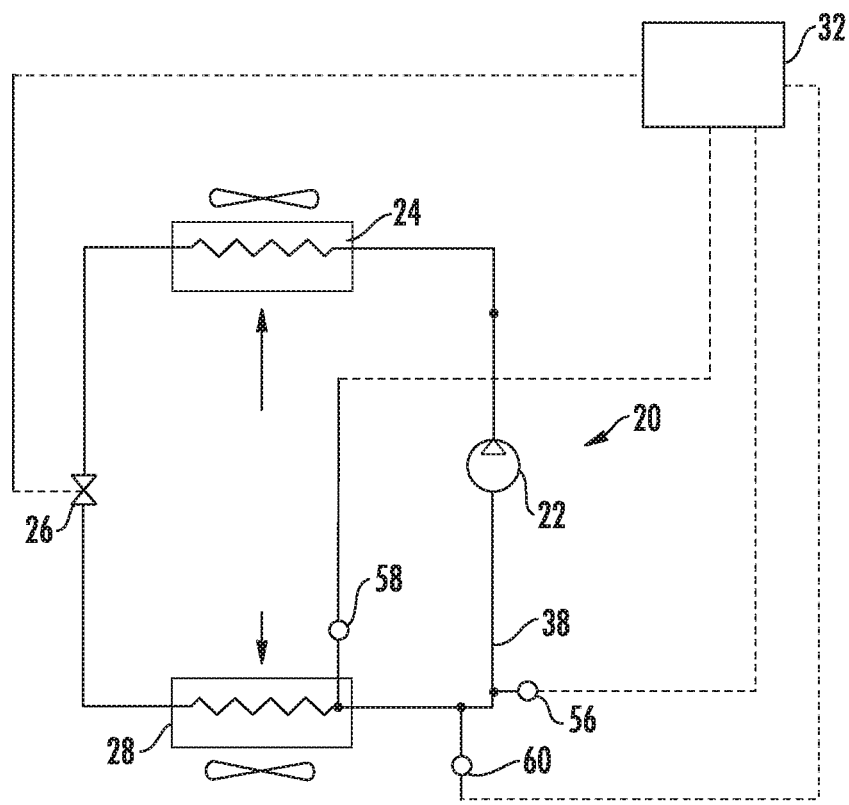
FIG. 1 is a schematic diagram of a refrigeration system according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Referring now to the drawings, FIG. 1 illustrates a schematic view of refrigerant system 20, such as that of an HVAC system, according to an embodiment of the present disclosure. Particularly, the system 20 includes a compressor 22 delivering compressed refrigerant downstream to a heat rejection heat exchanger 24 (a condenser for subcritical applications and a gas cooler for transcritical applications). An electronic expansion valve (EXV) 26 is located downstream from the heat rejection heat exchanger 24. The EXV 26 of an embodiment of the present disclosure is electrically driven by a stepper motor (not shown) that receives one or more control signals in the form of a discrete number of steps from an electronic controller 32. However, any type of controllable EXV may be used. The controller 32 of one embodiment of the present disclosure is a proportional integral derivative (PID) controller. It will be appreciated that the controller 32 of one or more additional embodiments may be a proportional derivative (PD) or a proportional (P) controller. The controller 32 of an embodiment includes a processor, a memory, and executable software stored in the memory. In one embodiment, any communication, control, operation, calculation, measurement, or determination performed in accordance with the present disclosure is performed by the controller 32 described herein.

Refrigerant having passed through the EXV 26 flows in sequence through an evaporator 28 and through a suction line 38 back to the compressor 22. In an embodiment of the present disclosure, there is a sensor 56 configured to measure a temperature or pressure of the refrigerant to determine the suction superheat value. The sensor 56 is placed between the expansion device 26 and the compressor 22. The sensor 56 communicates with the electronic controller 32, which in turn controls the EXV 26 to control the suction superheat. The sensor 56 in one embodiment is placed on or in the suction line 38 between the exit from the evaporator 28 and inlet to the compressor 22. The sensor 56 of one or more embodiments is a thermocouple or thermistor type.

In one embodiment, the sensor 56 may be any type of temperature sensor. The temperature or pressure sensed by sensor 56 determines superheat, which is the difference between the actual and saturated refrigerant temperatures at approximately the same location. One embodiment of the present disclosure includes an additional temperature sensor 58 placed within the evaporator 28, either in the refrigerant flow or externally on the evaporator surface, within the two-phase region to determine the saturated refrigerant temperature in the evaporator 28. The temperature sensor 58 communicates with the electronic controller 32, which in turn controls the EXV 26 to adjust and control the suction superheat. The difference between the two temperature measurements provided by the temperature sensors 56, 58 determines the suction superheat value in one embodiment.

In an additional embodiment, a pressure sensor 60 is utilized to determine pressure of the refrigerant at or near the location where the superheat value is to be obtained. In the embodiment of FIG. 1, the superheat value and pressure are determined in the suction line 38. The pressure sensor 60 communicates with the electronic controller 32. After the refrigerant pressure value is measured by the pressure sensor 60, it can be converted to a corresponding saturated temperature value as understood by those of ordinary skill in the art. The suction superheat value is then calculated by subtracting the measured actual refrigerant temperature from the obtained saturated refrigerant temperature.

In one or more embodiments, the temperature sensors 56, 58 are installed on the external surface of the tubing, compressor, and/or heat exchanger. The temperature sensors 56, 58 of one or more embodiments are insulated or shielded from the ambient environment to reduce the measurement error. The sensors 56, 58 are installed internally or within the refrigerant flow in further embodiments of the present disclosure. In such embodiments, the sensors 56, 58 installed in the refrigerant flow measure the temperature of the refrigerant directly.

In one or more embodiments, one or more of the sensors 56, 58, 60 provide one or more input signals to the controller 32. In an embodiment, the controller 32 provides one or more output signals to the EXV 26 resulting in stepping or other operation, actuation, or adjustment of the EXV 26 for superheat control. The embodiments discussed herein, including the operation of the system 20 and any individual components or sensors 56, 58, 60 included therein, are utilized for a system operating in either a cooling mode or a heating mode, i.e., a heat pump.

Figure 2:
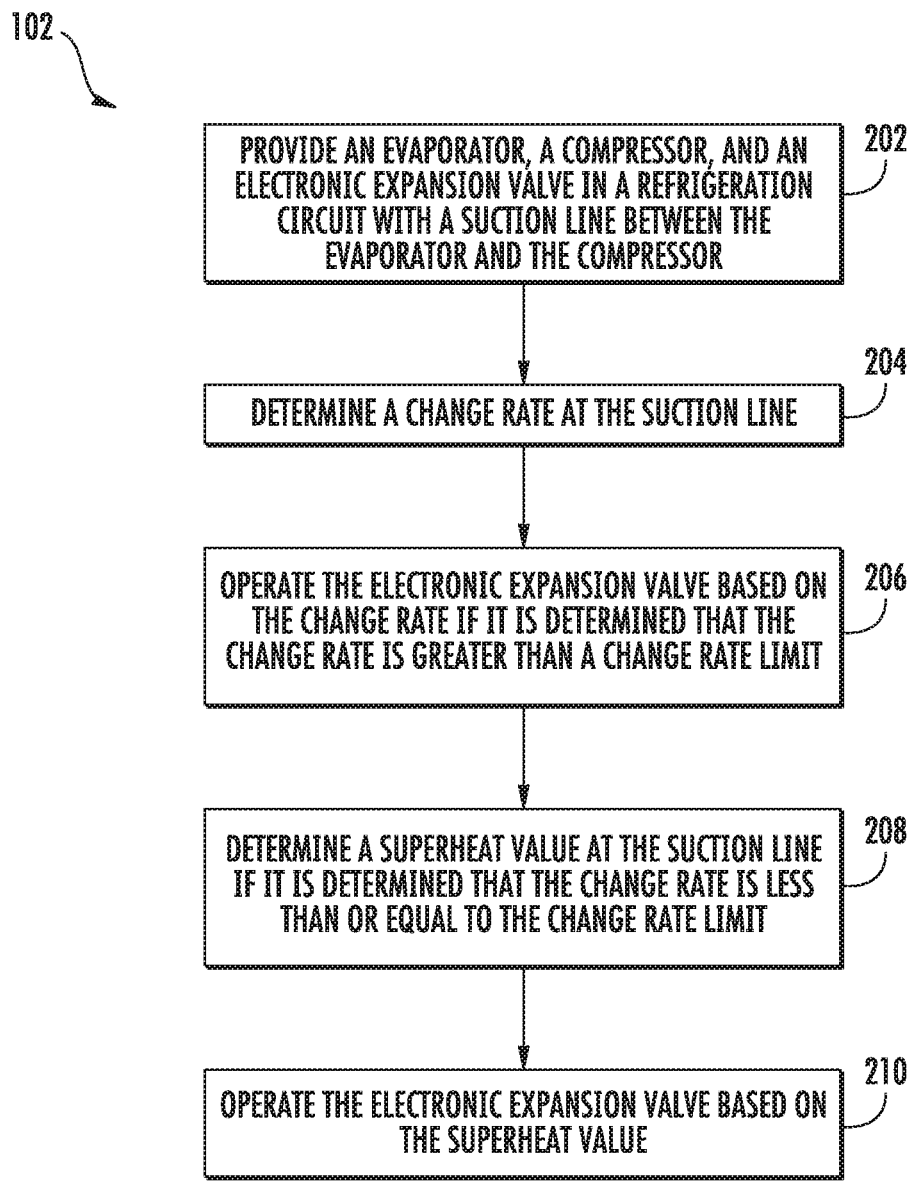
FIG. 2 shows a schematic flow diagram of a method of controlling an electronic expansion valve in a refrigeration system according to one embodiment of the present disclosure.

Referring now to FIG. 2, an embodiment of a method 102 of controlling the EXV 26 in accordance with the present disclosure is illustrated. Step 202 begins the method 102 illustrated in FIG. 2 by providing the evaporator 28, compressor 22, and EXV 26 in a refrigeration system 20 with the suction line 38 between the evaporator 28 and the compressor 22. The controller 32 then determines, at step 204, a change rate at the suction line 38. In one embodiment, the change rate is a suction pressure change rate 104. In another embodiment, the change rate is a temperature change rate 105.

As illustrated in step 206, if the controller 32 determines that the change rate is greater than a change rate limit, described in further detail below, the controller 32 operates the EXV 26 based on the change rate. In one embodiment, the change rate limit is a pressure change rate limit 106. In another embodiment, the change rate limit is a temperature change rate limit 107.

If the change rate is less than or equal to the change rate limit, the controller 32 determines, at step 208, a superheat value 110 at the suction line 38. Finally, the controller operates, at step 210, the EXV 26 based on the superheat value 110.

Figure 3:
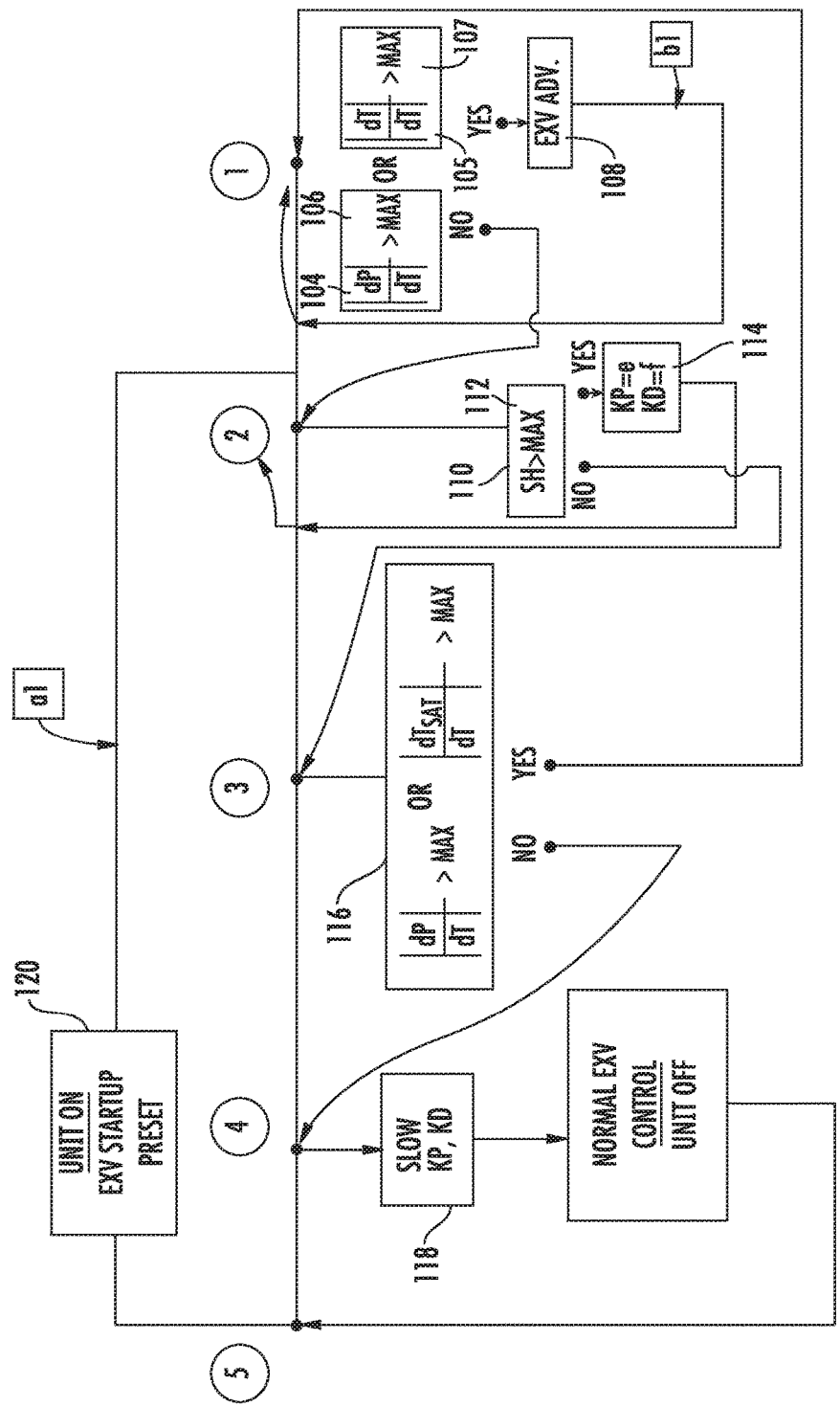
FIG. 3 illustrates a method of controlling an electronic expansion valve in a refrigeration system according to one embodiment of the present disclosure.

Referring now to FIG. 3, a schematic flow diagram of one embodiment of the method 102 is provided. The diagram of FIG. 3 illustrates loop 1 as the starting point of the method 102 of one embodiment. In one or more embodiments, the operation beginning at loop 1 occurs after a timer delay and/or upon startup or ramp-up of the system 20, startup of the compressor 22, and/or startup of the controller 32.

The controller 32 determines a suction pressure change rate 104 at the suction line 38 in loop 1. The controller 32 determines the suction pressure change rate 104 in an embodiment by determining an absolute value of the time derivative of a sensed, measured, or calculated suction pressure, such as a suction pressure measured by the pressure sensor 60, at the suction line 38. The suction pressure at the suction line 38 is determined in accordance with any of the techniques described above with regard to the sensors 56, 58, 60 or any other techniques recognized by one of ordinary skill in the art.

In another embodiment, the controller 32 determines the saturated suction temperature change rate 105 in an embodiment by determining an absolute value of the time derivative of a sensed, measured, or calculated saturated suction temperature, such as a saturated suction temperature measured by the temperature sensor 58. For the purposes of the present disclosure, each of the suction pressure change rate 104 and the temperature change rate 105 is also referred to herein as the change rate.

The controller 32 then determines if the suction pressure change rate 104 or temperature change rate 105 is greater than a pressure change rate limit or threshold 106, or a temperature change rate limit or threshold 107, respectively. For the purposes of the present disclosure, each of the pressure change rate limit 106 and the temperature change rate limit 107 is also referred to herein as the change rate limit. In an embodiment of the present disclosure, the pressure change rate limit 106 is between approximately 0.1 and approximately 2.0 pounds per square inch per second and the temperature change rate limit 107 would be between approximately 0.05 and approximately 1 degrees Fahrenheit per second. In one embodiment, the pressure change rate limit 106 is approximately 0.4 pound per square inch per second.

If the suction pressure change rate 104 or the temperature change rate 105 is greater than the pressure change rate limit 106 or the temperature change rate limit 107, the controller 32 operates or adjusts the EXV 26. In one embodiment, the controller 32 advances an EXV position 108 by a predetermined value upon determining that the suction pressure change rate 104 is greater than the pressure change rate limit 106, or upon determining that the temperature change rate 105 is greater than the temperature change rate limit 107.

The predetermined value of EXV position advancement in one or more embodiments is a discrete number of steps of the stepper motor falling between 20 and full open steps. In one embodiment, the predetermined value of EXV position advancement is 50 steps. In another embodiment, the predetermined value of EXV position advancement is 100 steps. In another embodiment, the predetermined value of EXV position advancement is 150 steps. In another embodiment, the predetermined value of EXV position advancement may be 20 steps or less.

After the controller 32 operates the EXV 26 in loop 1, the controller 32 waits a predetermined amount of time b1, in any increment of time, before repeating the step of determining whether the suction pressure change rate 104 or the temperature change rate 105 is greater than the pressure change rate limit 106 or the temperature change rate limit 107, respectively. The predetermined amount of time b1 in one or more embodiments falls in the range of between 5 and 90 seconds. In one embodiment, the predetermined amount of time b1 is 20 seconds. In one embodiment, the predetermined amount of time b1 may be 20 seconds or less. In one embodiment, the predetermined amount of time b1 may be greater than 90 seconds.

If, after waiting the predetermined amount of time b1, the controller 32 determines that suction pressure change rate 104 or the temperature change rate 105 is less than or equal to the pressure change rate limit 106 or the temperature change rate limit 107, respectively, the process continues to loop 2. At loop 2 of FIG. 3, the controller 32 determines a superheat value 110 at the suction line 38. The superheat value 110 is determined in accordance with any of the techniques described above with regard to the sensors 56, 58, 60 or any other techniques recognized by one of ordinary skill in the art. The controller 32 determines in loop 2 whether the superheat value 110 exceeds a threshold superheat value 112. In one or more embodiments, the threshold superheat value 112 falls between 5 and 25 degrees Fahrenheit (° F.). In an embodiment, the threshold superheat value 112 is approximately 16° F. In another embodiment, the threshold superheat value 112 is 20° F. In another embodiment, the threshold superheat value 112 is less than 5° F. In another embodiment, the threshold superheat value 112 is greater than 25° F.

The controller then operates the EXV 26 based on the superheat value 110. If the superheat value 110 exceeds the threshold superheat value 112, the controller 32 operates the EXV 26 using a first set of control parameters 114. In one embodiment, the controller 32 utilizes the first set of control parameters 114 to operate the EXV 26 at a relatively fast control rate, such as for an operation that will react quickly to a superheat value 110 that is far away from the desired setpoint. In one embodiment, the first set of control parameters 114 includes a multiplicative proportional (KP) value between 0.25 and 1.5 and a multiplicative derivative (KD) value between 1.0 and 3.0. In an embodiment KP is 0.75. In an embodiment KP is less than 0.25 or greater than 1.5. In an embodiment KD is 1.75. In an embodiment KD is less than 1 or greater than 3. Following the operation of the EXV 26 in loop 2, the controller 32 repeats the step of determining whether the superheat value 110 exceeds the threshold superheat value 112.

If the superheat value 110 is less than or equal to the threshold superheat value 112, the process continues to loop 3. If the superheat value 110 is not less than or equal to the threshold superheat value 112, the process repeats loop 2. At loop 3, the controller 32 again determines if the suction pressure change rate 104, or the temperature change rate 105, is greater than the pressure change rate limit 106, or the temperature change rate limit 107, respectively, at box 116.

If the suction pressure change rate 104, or the temperature change rate 105, is greater than the pressure change rate limit 106, or the temperature change rate limit 107, respectively, the process returns to the start of the process at loop 1. If the suction pressure change rate 104, or the temperature change rate 105, is less than or equal to the pressure change rate limit 106, or the temperature change rate limit 107, respectively, the method 102 illustrated in FIG. 3 proceeds to loop 4, where the controller 32 executes normal control of the EXV 26. At loop 4, the controller 32 operates the EXV 26 using a second set of control parameters 118. In the embodiment illustrated in FIG. 3, the second set of control parameters 118 correspond to operation of the EXV 26 at a relatively slower response control rate as compared to the first set of control parameters 114.

The system enters loop 5, and the system 20 is turned off. Upon restarting of the system 20 at box 120, the controller 32 sets the EXV position 108 to a predetermined setting that is appropriate for startup. The controller 32 receives one or more signals relating to system speed, one or more superheat values, including superheat value 110, one or more pressures, one or more temperatures, one or more pressure change rates, or one or more temperature change rates, to initiate control of the EXV 26. Following a predetermined amount of startup time al, the controller 32 executes the method 102 as illustrated in FIG. 3, beginning with loop 1. In an embodiment, the amount of startup time al is between 5 and 125 seconds. In an embodiment, the amount of startup time al is approximately 15 seconds. In an embodiment, the amount of startup time al is less than 5 seconds or greater than 125 seconds.

It will be appreciated that the embodiments provided in the present disclosure provide for reliable operation of the system 20 across all operating ranges, including in cold start and long line application conditions. The ability to reliably operate the system 20 across all ranges allows the accurate control of the EXV 26 to provide high system efficiency without a risk of system shutdown or non-operation at certain conditions under certain circumstances.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. A method of controlling an electronic expansion valve in a refrigeration system, the method comprising the steps:
    providing an evaporator, a compressor, and an electronic expansion valve in a refrigeration circuit with a suction line between the evaporator and the compressor;
    determining a change rate at the suction line, the change rate corresponding to a suction pressure change rate;
    determining a superheat value at the suction line if it is determined that the change rate is less than or equal to a change rate limit, the change rate limit is a pressure change rate limit; and
    operating the electronic expansion valve based on the superheat value.

2. The method of claim 1, further comprising operating the electronic expansion valve based on the change rate if it is determined that the change rate is greater than the change rate limit.

3. The method of claim 2, wherein operating the electronic expansion valve based on the change rate includes advancing the electronic expansion valve position by a predetermined value of steps.

4. The method of claim 3, wherein operating the electronic expansion valve based on the change rate further includes waiting a predetermined amount of time before repeating the step of determining the change rate.

5. The method of claim 1, further comprising determining whether the superheat value exceeds a threshold superheat value.

6. The method of claim 5, further comprising operating the electronic expansion valve using a first set of control parameters if the superheat value exceeds a threshold superheat value.

7. The method of claim 6, further comprising operating the electronic expansion valve using a second set of control parameters if the change rate is less than or equal to the change rate limit, wherein the first set of control parameters corresponds to a faster control rate than the second set of control parameters.

8. The method of claim 1, further including determining another change rate at the suction line, wherein the change rate is a temperature change rate and determining the superheat value at the suction line if it is determined that the change rate is less than or equal to a change rate limit, wherein the change rate limit is a temperature change rate limit.

9. A refrigeration system comprising:
    a compressor disposed in a refrigeration circuit; an evaporator disposed in the refrigeration circuit;
    a suction line disposed in the refrigeration circuit between the evaporator and the compressor;
    an electronic expansion valve disposed in the refrigeration circuit; and
    a controller in electrical communication with the electronic expansion valve, wherein the controller is configured to:
    determine a change rate at the suction line, the change rate corresponding to a suction pressure change rate;
    determine a superheat value at the suction line; and
    operate the electronic expansion valve based on the superheat value if the change rate is less than or equal to a change rate limit, the change rate limit is a pressure change rate limit.

10. The system of claim 9, wherein the controller is further configured to determine a superheat value at the suction line after determining that the change rate is less than or equal to a change rate limit.

11. The system of claim 9, wherein the controller is further configured to operate the electronic expansion valve based on the change rate if it is determined that the change rate is greater than the change rate limit.

12. The system of claim 11, wherein the controller is further configured to advance an electronic expansion valve position by a predetermined value based on the change rate.

13. The system of claim 12, wherein the controller is further configured to again determine the change rate following the passage of a predetermined amount of time after advancing the electronic expansion valve position by the predetermined value.

14. The system of claim 9, wherein the controller is further configured to determine whether the superheat value exceeds a threshold superheat value.

15. The system of claim 14, wherein the controller is further configured to operate the electronic expansion valve using a first set of control parameters if the superheat value exceeds a threshold superheat value.

16. The system of claim 15, wherein the controller is further configured to operate the electronic expansion valve using a second set of control parameters if the change rate is less than or equal to the change rate limit, wherein the first set of control parameters corresponds to a faster control rate than the second set of control parameters.

17. A controller for use with a refrigeration system comprising: a processor;
a memory; and
executable software stored in the memory, wherein the executable software determines a change rate at a suction line between a compressor and an evaporator of the refrigeration system, determines a superheat value at the suction line if it is determined that the change rate at the suction line is less than or equal to a change rate limit, the change rate corresponding to a suction pressure change rate and the change rate limit is a pressure change rate limit, and operates an electronic expansion valve based on the superheat value.

18. The controller of claim 17, wherein the executable software transmits an electronic expansion valve advancing signal to the electronic expansion valve based on the change rate if it is determined that the change rate is greater than the change rate limit.

19. The controller of claim 17, wherein the executable software transmits a first control signal to the electronic expansion valve using a first set of control parameters if the superheat value exceeds a threshold superheat value and transmits a second control signal to the electronic expansion valve using a second set of control parameters if the change rate is less than or equal to the change rate limit, wherein the first set of control parameters corresponds to a faster control rate than the second set of control parameters.

20. The method of claim 2, wherein operating the electronic expansion valve based on change rate is applied to operating the refrigeration system in a start-up mode.

* * * * *